United States Patent
Koide et al.

(10) Patent No.: US 8,096,934 B2
(45) Date of Patent: Jan. 17, 2012

(54) SYSTEM FOR TREATING CARBON DIOXIDE, AND METHOD FOR STORING SUCH TREATED CARBON DIOXIDE UNDERGROUND

(75) Inventors: Hitoshi Koide, Tokyo (JP); Junji Shinoda, Tokyo (JP)

(73) Assignee: Mizuho Information & Research Institute Inc., Tokyo (JP)

( * ) Notice: Subject to any disclaimer, the term of this patent is extended or adjusted under 35 U.S.C. 154(b) by 441 days.

(21) Appl. No.: 12/306,382

(22) PCT Filed: Jun. 27, 2007

(86) PCT No.: PCT/JP2007/062915
§ 371 (c)(1),
(2), (4) Date: Dec. 29, 2008

(87) PCT Pub. No.: WO2008/001812
PCT Pub. Date: Jan. 3, 2008

(65) Prior Publication Data
US 2009/0202304 A1     Aug. 13, 2009

(30) Foreign Application Priority Data
Jun. 28, 2006  (JP) ................................ 2006-178345

(51) Int. Cl.
*B09B 1/00* (2006.01)
(52) U.S. Cl. .................................... 588/250; 405/129.1
(58) Field of Classification Search .................. 588/250; 405/129.1, 129.35
See application file for complete search history.

(56) References Cited

U.S. PATENT DOCUMENTS

| | | | | | |
|---|---|---|---|---|---|
| 5,340,382 | A | * | 8/1994 | Beard | 95/151 |
| 5,397,553 | A | * | 3/1995 | Spencer | 422/243 |
| 5,402,848 | A | * | 4/1995 | Kelly | 166/266 |
| RE39,077 | E | * | 4/2006 | Eaton | 588/250 |

FOREIGN PATENT DOCUMENTS

| | | |
|---|---|---|
| JP | 04-190829 A | 7/1992 |
| JP | 06-021009 A | 1/1994 |
| JP | 06-170215 A | 6/1994 |
| JP | 2958460 B1 | 10/1999 |
| JP | 2000-227085 A | 8/2000 |
| JP | 2004-237167 A | 8/2004 |
| JP | 2004-261658 A | 9/2004 |

* cited by examiner

*Primary Examiner* — John Kreck
(74) *Attorney, Agent, or Firm* — Lowe Hauptman Ham & Berner, LLP (57) ABSTRACT

The present invention provides a system for treating carbon dioxide, and a method by which such treated carbon dioxide can be stored underground at low cost and with high efficiency. The present invention' method for storing carbon dioxide underground includes: a step for pumping up to the ground groundwater from a pumping well in a deep aquifer, and then producing injection water. Carbon dioxide that has been separated and recovered from exhaust gas from a plant facility is changed into the bubbles. The bubbles are mixed with the injection water, and hereby produces a gas-liquid mixture a step for injecting into. The deep aquifer is injected into the gas-liquid mixture from the injection well. The method preferably further includes a step for dissolving a cation-forming material in the injection water, and a step for injecting the injection water, in which the cation-forming material is dissolved, into the deep acquifer at its top and above the place at which injection water has already been injected.

5 Claims, 5 Drawing Sheets

SYSTEM FOR TREATING CARBON DIOXIDE, AND METHOD FOR STORING SUCH TREATED CARBON DIOXIDE UNDERGROUND

CROSS-REFERENCE TO RELATED APPLICATIONS

The present Application is based on International Application No. PCT/JP2007/062915, filed on Jun. 27, 2007, which in turn corresponds to Japanese Application No. 2006-178345 filed on Jun. 28, 2006, and priority is hereby claimed under 35 USC §119 based on these applications. Each of these applications are hereby incorporated by reference in their entirety into the present application.

FIELD OF THE INVENTION

The present invention relates to the storing underground of carbon dioxide ($CO_2$) that is in exhaust gas generated from a combustion furnace or an incinerator, and more particularly to a method and system for treating carbon dioxide without the need for a facility that changes carbon dioxide into a supercritical fluid.

BACKGROUND OF THE INVENTION

As a countermeasure against global warming, it is Japan's duty to reduce, between 2008 and 2012, the emission volume of greenhouse gas by an average of 6% per annum from the level of 1990. However, in 2002, the volume of Japan's greenhouse-gas emissions increased by 7.6% over the volume for 1990. If this continues, it will be difficult to achieve the 6% reduction goal. Therefore, the government has adopted the Kyoto Protocol Target Achievement Plan, which has standards stricter than those of existing countermeasures against global warming, and which presents goals for reducing the $CO_2$ that is emitted when energy is utilized in various sectors of societal activity. The plan provides that, for 2010 the volume of $CO_2$ emissions from the energy-conversion sector (e.g., power plants) should be 16.1% less than in 1990, the volume from the industrial sector should be 8.6% less, the volume from the transportation sector should not be more than 15.1% higher, the volume from the other sector including the service sector should not be more than 15.0% higher, and the volume of household emissions should not be more than 6.0% higher. However, in Japan, energy-saving measures have already been implemented in the industrial sector, where the largest reduction in $CO_2$ emission volume can be expected. Therefore, the cost of further reducing carbon dioxide emissions will be significantly high, which is a problem.

Greenhouse gas includes six kinds of gases, e.g., carbon dioxide, methane, and hydrochlorofluorocarbon. In Japan, however, 90% or more of the greenhouse gas that is emitted is carbon dioxide. The United States and the European Union are storing carbon dioxide underground as an effective measure for reducing that greenhouse gas, but in Japan, storing carbon dioxide underground is considered unsuitable due to Japan's geological conditions as well as the frequent earthquakes that occur in this country. The conventional method of storing carbon dioxide underground is to seal carbon dioxide, which is in the form of a supercritical fluid (i.e., under high temperature and high pressure, where a distinction between liquid and gas cannot be made), under a rigid sealing layer or caprock layer. However, in Japan it is difficult to find a place that is economical and suitable for that type of storage. Patent Document 1, "Method for Operating a System of Separation and Recovery of Carbon Dioxide By Using a Steel Plant Facility," discloses a system for separating and recovering carbon dioxide from byproduct gases emitted from a steel plant. The carbon dioxide that is separated and recovered from the steel plant is fed to an immobilizing facility via a transportation means such as a pipe. The carbon dioxide in the immobilizing facility is then injected into an aquifer underground, injected into a depleted gas field, or stored in the ocean, so that the carbon dioxide is immobilized. Patent Document 2, "Device for Liquefaction and Sedimentation of Gases," discloses that seawater and carbon dioxide that has been liquefied under high pressure are alternately pumped and fed deep into the sea.

Patent Document 1: Japanese Patent Application Publication No. 2004-237167

Patent Document 2: Japanese Patent Application Publication No. 2000-227085

SUMMARY OF THE INVENTION

The objectives of the present invention are to provide (1) a method by which carbon dioxide can be stored underground at low cost and with high efficiency, and (2) a system for treating carbon dioxide to enable its use with that method.

In one aspect of the invention, the present invention describes a method for storing carbon dioxide underground.

The method includes a step for pumping up groundwater from a deep aquifer through a pumping well to aboveground, so as to produce injection water. Carbon dioxide that has been separated and recovered from the exhaust gas from a plant facility is changed into fine bubbles, and the carbon dioxide bubbles are mixed with the injection water so as to produce a gas-liquid mixture. The gas-liquid mixture is injected through an injection well into the deep aquifer.

In another aspect of the present invention, cation-forming material is dissolved in said the injection water. The injection water is injected, in which the cation-forming material has been dissolved, into the top portion of the deep aquifer, at a position higher than where the gas-liquid mixture has already been injected.

In yet another aspect of the present invention a system is disclosed for storing carbon dioxide underground, with the system including a pumping well that reaches a deep aquifer, a pump that pumps up groundwater from the pumping well, an injection well that reaches the deep aquifer, a liquid injection device that feeds into the injection well as injection water the groundwater that has been pumped up, a gas injection device that feeds into the injection well carbon dioxide that has been separated and recovered from exhaust gas from a plant facility, and a nozzle that is arranged inside the injection well and that changes the carbon dioxide into fine bubbles.

The carbon dioxide bubbles are dissolved in the injection water, and the gas-liquid mixture, which is a mixture of the fine bubbles of the carbon dioxide and the injection water, is injected into the deep aquifer.

In a still further aspect of the present invention, a double pipe includes an outer pipe and an inner pipe is installed in the injection well. The injection water is fed into between the outer pipe and the inner pipe, and the carbon dioxide is fed into the inner pipe.

In yet another aspect of the present invention, the nozzle has an outside diameter equal to the inside diameter of the outer pipe. The nozzle is mounted to the top end of the inner pipe. An injection-water spray pipe that is at the top of the nozzle, and one end of which is open between the outer pipe and the inner pipe, and the other end of which is open at the bottom of the nozzle. A carbon-dioxide spray pipe is at, one end of which is open at the inner pipe at the top of the nozzle, and the other end of which is connected to an intermediate part of the injection-water spray pipe.

In yet another aspect of the present invention a device raises and lowers the inner pipe, and a cation-forming-material dissolving device the inner pipe and the nozzle, which have been installed so as to reach the deep aquifer, are pulled up to the top of the deep aquifer. The injection water, in which the cation-forming material is dissolved, is injected at a place higher than where the gas-liquid mixture has already been injected.

The method of the present invention for storing carbon dioxide underground has the following effect. When carbon dioxide—in the form of fine bubbles or as a supercritical fluid—is dissolved into groundwater that has been pumped up from a deep aquifer, about 50 kg of carbon dioxide becomes dissolved in 1 $m^3$ (1000 kg by weight) of water, under high pressure and at a high temperature in the deep aquifer. Carbon dioxide in the form of fine bubbles can be diffused more widely in a deep aquifer than can a supercritical fluid that becomes solidified (becomes a plume) after being injected into a deep aquifer. In addition, the area of contact between groundwater and carbon dioxide in the form of fine bubbles is significantly larger than the area of contact between groundwater and a supercritical fluid. Therefore, the rate of solution of the carbon dioxide in the form of fine bubbles into groundwater is several hundred to several thousand times faster than rate of solution of a supercritical fluid into groundwater. Also, a caprock layer (a sealing layer or an impermeable layer) often exists in places like an oil field. Even where there is no caprock layer (a sealing layer or an impermeable layer), the fine bubbles of carbon dioxide go into gaps between the soil particles, and become stabilized. The weight of carbon dioxide under 1 atm and at 0° C. is 1.98 $kg/m^3$. So, for example, if 50 kg of carbon dioxide is to be dissolved in 1 $m^3$ of water, it is possible to stabilize about 25 $m^3$ of carbon dioxide in 1 $m^3$ of the groundwater.

The invention described has the following effect. A cation-forming material (e.g., coal ash, calcium hydroxide, blast-furnace slag, or liquid glass) is dissolved in the injection water. The injection water is then injected into the top portion of the aquifer, at a place that is above the place where the gas-liquid mixture has been injected. Thus, the fine bubbles injected into the deep aquifer react with cations, and, as a result, a barrier of carbonate compound is created. Therefore, upward diffusion of carbon dioxide is prevented. In other words, an artificial sealing layer is formed.

The present invention's system described for storing carbon dioxide underground has the following effect. Carbon dioxide is turned into fine bubbles so as to be dissolved in groundwater that has been pumped up from a deep aquifer. Therefore, it is possible to dissolve a larger amount of carbon dioxide—an amount larger than when using a conventional method—into the injection water. In addition, the carbon dioxide that does not become dissolved is mixed with the injection water so as to form a gas-liquid mixture that is fed into the deep aquifer. The fine bubbles go into the gaps between the soil particles, react with minerals in the soil particles, and change into, for example, carbonate minerals. The carbon dioxide is thus stabilized.

In the invention described, a double pipe is used for the injection well, and therefore it is possible to simultaneously feed both injection water and carbon dioxide to the bottom of the injection well. This leads to instantaneous production of a gas-liquid mixture in the injection well, and there is no need for a special mixing device aboveground.

The invention described uses a nozzle in which a carbon-dioxide spray pipe is connected with an injection-water spray pipe. As a result, carbon dioxide bubbles can be produced efficiently.

The invention described utilizes an inner-pipe raising/lowering device that raises and lowers the inner pipe so that it can be inserted into, removed from, and reinserted into the outer pipe, and a cation-forming-material dissolving device. Therefore, a cation layer of, for example, calcium hydroxide, can be formed above the gas-liquid mixture that has been injected. Accordingly, even if the fine bubbles injected into the deep aquifer go upward, the upward diffusion path of carbon dioxide is blocked by the carbonate compound barrier that has been created due to the reaction between the fine bubbles and the cations. In other words, an artificial sealing layer is formed. Incidentally, after the inner pipe and the nozzle are pulled up, a new slit is opened at an appropriate place in the intermediate part of the outer pipe.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF EXPLANATION OF THE DRAWINGS

The present invention is illustrated by way of example, and not by limitation, in the figures of the accompanying drawings, wherein elements having the same reference numeral designations represent like elements throughout and wherein.

EXPLANATIONS OF NUMBERS USED IN THE DRAWINGS 1 pump
2 liquid injection device
3 plant facility
4 gas injection device
5 nozzle
6a, 6b inner pipes
7a, 7b outer pipes
8a, 8b double pipes
9 pump
10 jet suction part
11 water storage tank
12 water feeding tank 13 water injection tank
14 water injection pump
15 filter
16 combustion furnace or incinerator
17 carbon-dioxide separating-and-recovering device
18 cooling device
19 dehumidifying device
20, 20a-20i pumping wells
21, 21a-21d injection wells
22a, 22b, 22c compressors
23 feeding-side carbon-dioxide storage tank
24 receiving-side carbon-dioxide storage tank
25a, 25b flow-control valves
26a, 26b, 26c pressure control valves
27 flow meter
28a, 28b pressure meters
29 useful-gas extracting device
30 cation-forming-material dissolving device
31 inner-pipe raising/lowering device
32 injection-water spray pipe
33 carbon-dioxide spray pipe
34 bubbles
35 slit
36 tower
37 winch
38 winding-and-rewinding wire rope
39 pulley
40 suspension fixture
50 deep aquifer
50a, 50b deep aquifers
51 impermeable layer
51a, 51b impermeable layers
53 groundwater
54 injection water
55 carbon dioxide
56 gas-liquid mixture
58 pressurized water
58 soil surface
59 non-storage layer
60-64 steps for treating carbon dioxide
100 carbon dioxide treating system

BEST MODES FOR CARRYING OUT THE INVENTION

Figure 7:
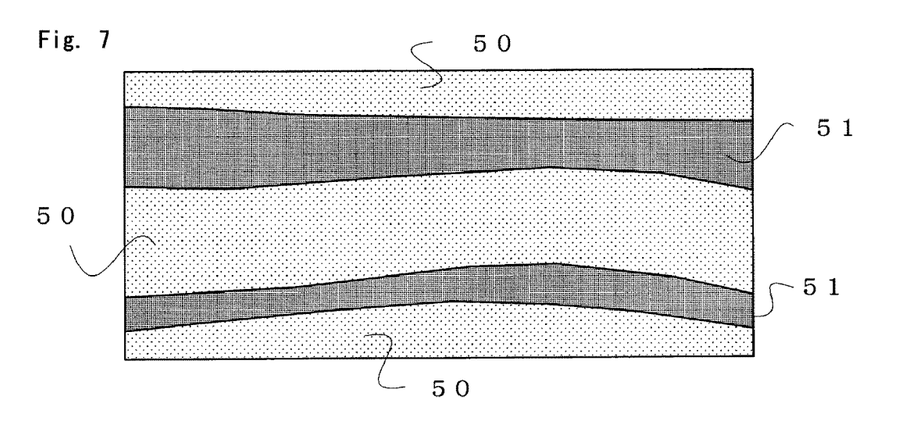
FIG. 7 shows the general structure of layers underground.

The present invention's method for storing carbon dioxide underground, and system for treating carbon dioxide will now be described with reference to the drawings. FIG. 7 shows the general structure of underground layers. The deep aquifer 50 is a water-permeable layer that includes fine sand layers and that is saturated with salt water not suitable for use as a water resource. Here, a depth of about 1000 m underground is regarded as a deep layer. Also, there is an impermeable layer 51 above the deep aquifer 50. Storage of carbon dioxide in the deep aquifer can be expressed by the following reaction formulas. The dissolution of carbon dioxide in water is expressed by $CO_2 + H_2O = H_2CO_3$. The ionization of this dissolved carbon dioxide is expressed by $H_2CO_3 = H^+ + HCO_3^-$. The reaction of this ionized dissolved carbon dioxide with soil particles is expressed by, for example, $CaSiO_3 + HCO_3^- = CaCO_3 + SiO_2 + H_2O$. $CaCO_3$ is a carbonate compound, which means that the carbon dioxide has been stabilized.

Embodiment 1

Figure 1:
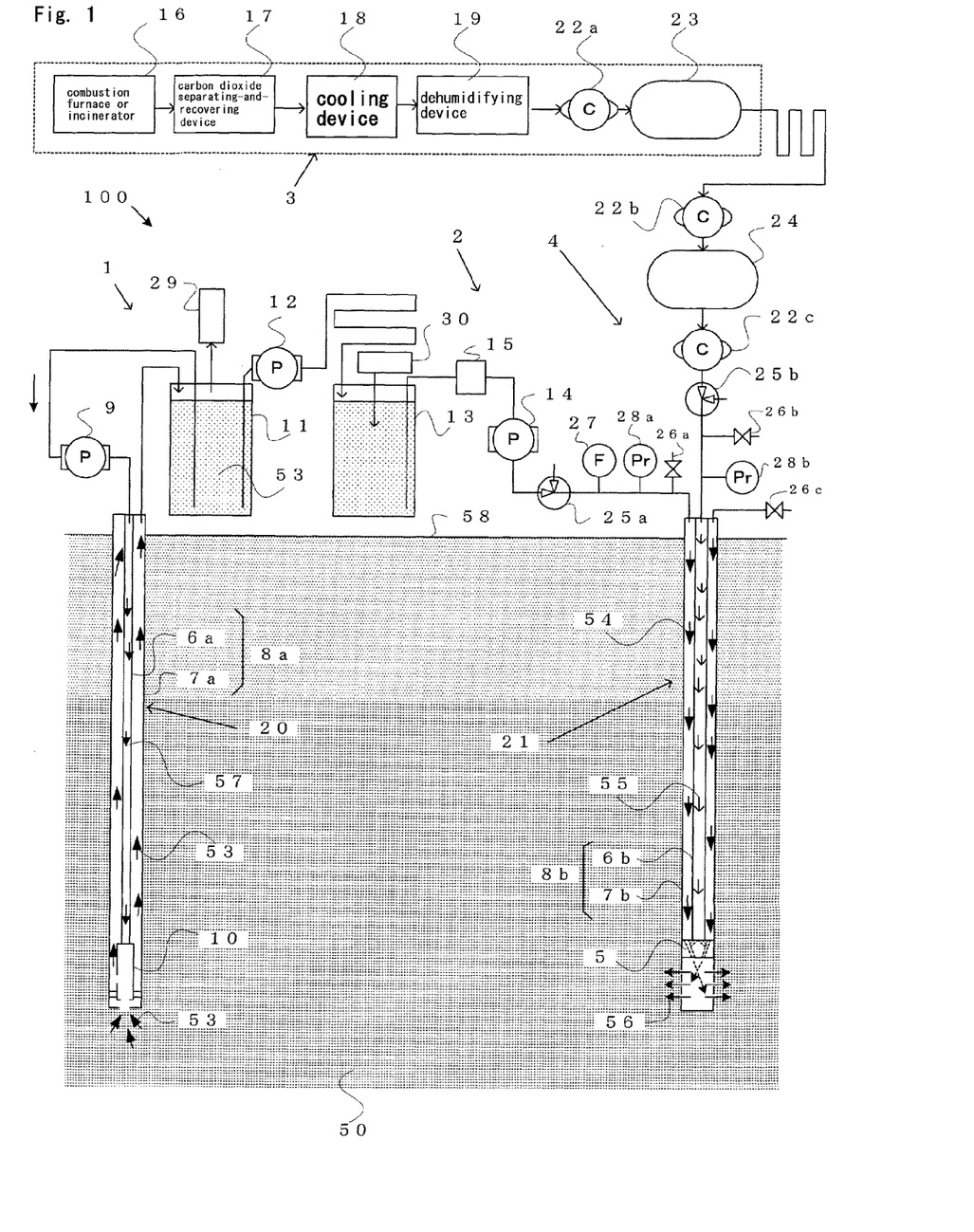
FIG. 1 shows the constitution of the present invention's system for storing carbon dioxide underground (Embodiment 1).

FIG. 1 shows the constitution of the present invention's system for storing carbon dioxide underground.

The carbon-dioxide treating system 100 includes
a pumping well 20 that reaches a deep aquifer 50,
a pump 1 that pumps up groundwater 53 from the pumping well 20,
an injection well 21 that reaches the deep aquifer 50,
a liquid injection device 2 that feeds pumped-up groundwater 53—as injection water 54—into the injection well 21,
a gas injection device 4 that feeds into the injection well 21 carbon dioxide 55 that has been separated and recovered from exhaust gas from an outside plant facility 3, and
a nozzle 5 that changes the carbon dioxide 55 into fine bubbles inside the injection well 21.

The carbon dioxide 55 is changed into fine bubbles by the nozzle 5, and the fine bubbles are then dissolved in the injection water 54. A gas-liquid mixture 56 of carbon dioxide 55 and injection water 54 is injected into the deep aquifer 50. The plant facility 3 includes a thermal power plant and a garbage incinerator facility. Although there are multiple layers from the soil surface 58 to the deep aquifer 50 at, for example, a depth of 1000 m underground, only one layer, that of the deep aquifer 50, is shown here.

A double pipe 8a that includes an inner pipe 6a and an outer pipe 7a is installed in the pumping well 20. The pump 1 includes a pumping pump 9, a jet suction part 10, a water storage tank 11, a water feeding pump 12, and the double pipe 8a. Pressurized water 57 is fed to the inner pipe 6a by the pumping pump 9 in order to pump up the groundwater 53, which in turn is pumped up by the jet suction part 10 so as to be stored in the water storage tank 11. The jet suction part 10 increases the rate of flow of the pressurized water 57 so as to generate negative pressure in order to suck in the groundwater 53. The groundwater that is stored in the water storage tank 11 can be circulated so as to be used as the water to be put into the pumping pump 9. The water storage tank 11 can be equipped with a useful-gas extracting device 29, which recovers methane and other gases contained in the underwater 53.

The liquid injection device 2 includes
a water injection tank 13,
a water injection pump 14 for feeding the injection water 54 into the injection well 21,
a filter 15 for removing impurities from the groundwater, and
a cation-forming-material dissolving device 30.

The distance between the pumping well 20 and the injection well 21 typically is from 500 m to 1 km, and the water storage tank 11 is connected with the water injection tank 13 by a pipeline. The cation-forming-material dissolving device 30 injects a cation-forming material—for example, coal ash, blast-furnace slag, calcium hydroxide, water glass, and the like—into the water injection tank 13. The carbon dioxide reacts with the cation-forming material over time and becomes stabilized as a carbonate compound. If the impermeable layer at the top of the deep aquifer 50 is fragile and needs to be reinforced, urgent reinforcement can be done based on results obtained through a monitoring well. In other words, it is possible to achieve stabilized storage of carbon dioxide in the deep aquifer for a long period of time.

The plant facility 3 includes
a combustion furnace or incinerator 16,
a device 17 for separating and recovering the carbon dioxide contained in exhaust gas emitted from the combustion furnace or incinerator 16,
a device 18 for cooling carbon dioxide,
a dehumidifying device 19,
a compressor 22a, and a feeding-side carbon-dioxide storage tank 23 for temporary storage of carbon dioxide.

A large thermal power plant exhausts 1,000,000 tons of $CO_2$ per year. Underground storage of carbon dioxide is suitable for treating such a large amount of carbon dioxide.

The gas injection device 4 includes
a receiving-side carbon-dioxide storage tank 24 that stores carbon dioxide fed from the feeding-side carbon-dioxide storage tank 23, and
compressors 22b, 22c.

As shown in FIG. 1, flow-control valves 25a, 25b, pressure control valves 26a, 26b, 26c, a flow meter 27, and pressure meters 28a, 28b are mounted to the liquid injection device 2 and to the gas injection device 4. When the plant facility 3 is near the injection well 21, the feeding-side carbon-dioxide storage tank 23 can be connected to the receiving-side carbon-dioxide storage tank 24 by a pipeline. When the plant facility is away from the injection well, carbon dioxide can be transported by a tanker. In the carbon-dioxide separating-and-recovering device 17, the carbon dioxide can be condensed to a concentration of 90% or higher, using a chemical-absorption technique.

The injection well 21 is provided with a double pipe 8b that includes an inner pipe 6b and an outer pipe 7b. The carbon dioxide 55 is fed to the inner pipe 6b, and the injection water 54 is fed into between said outer pipe 7b and said inner pipe 6b. Thus, the double pipe 8b is commonly used with the liquid injection device 2 and the gas injection device 4. It also is possible for the injection well 21 to not be provided with a double pipe 8b. However, if a double pipe 8b is used, a gas-liquid mixture 56 can be produced at a deep part of the deep aquifer 50. A nozzle 5 is installed at the bottom end of the inner pipe 6b. The carbon dioxide 55 is changed into bubbles that are emitted from the nozzle 5 into the injection water 54 so as to produce the gas-liquid mixture 56. Due to the injection pressure of the pumps, the gas-liquid mixture 56 is diffused in the deep aquifer 50 from a slit formed at the bottom of the outer pipe 7b.

The gas-liquid mixture 56 can have higher permeability than that possible for only a liquid containing no gas. When the gas is in the form of fine bubbles, it is difficult for the fine bubbles to solidify, and therefore, the gas-liquid mixture 56 can be diffused well in the deep aquifer 50. Some of the fine bubbles in this process burst, while the other fine bubbles enter the gaps between sand particles and become stabilized. When carbon dioxide is injected in the form of a supercritical fluid, a solid (plume) is formed, but in this case plume formation does not occur.

Figure 2:
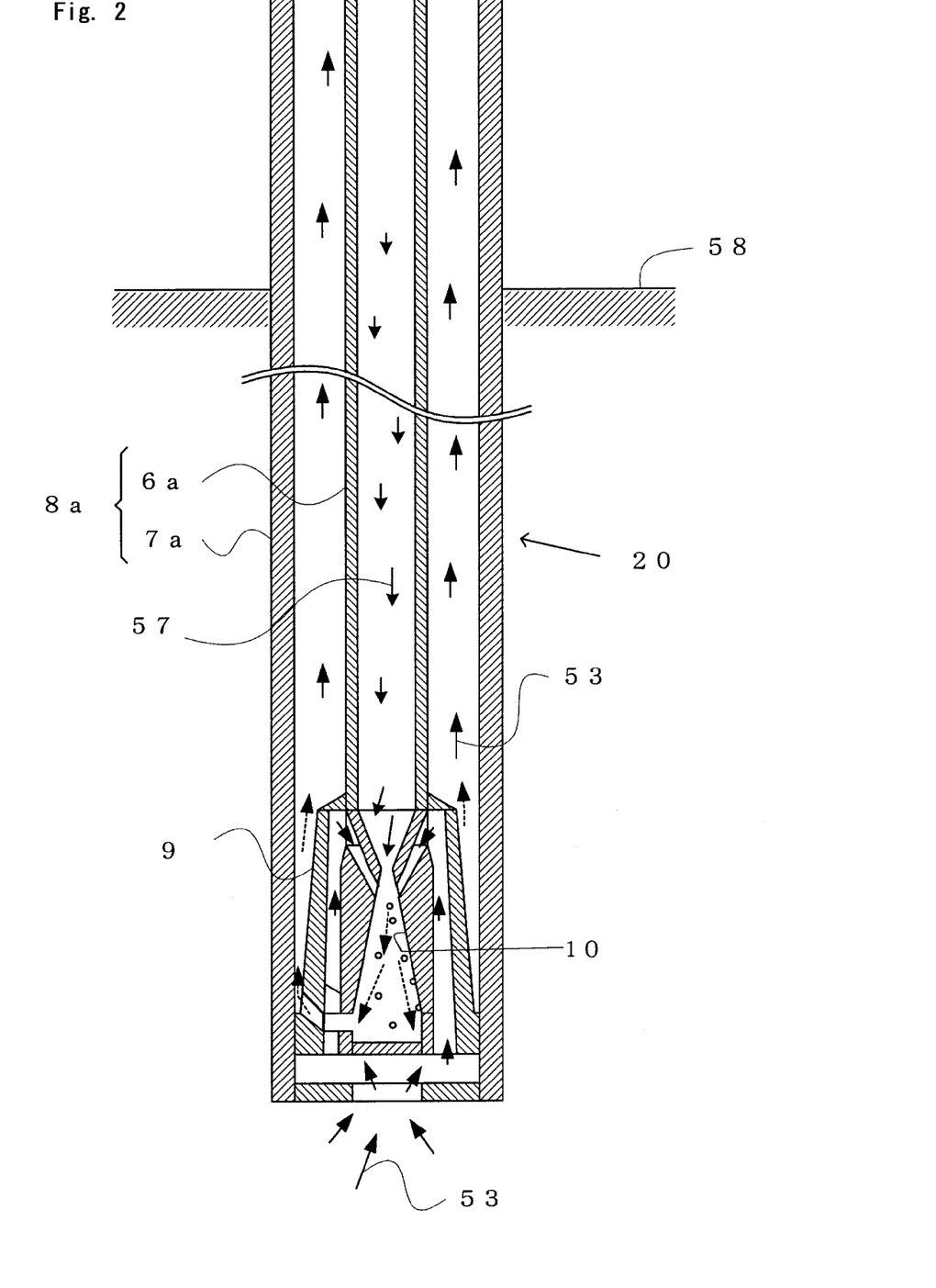
FIG. 2 is a cross-sectional view of a double pipe that constitutes a pumping well (Embodiment 1).

FIG. 2 is a cross-sectional view of the double pipe of the pumping well. The jet suction part 10 is shaped into an inverted funnel so as to increase the rate of flow of the pressurized water from the inner pipe 6a. The inside of the inverted funnel shape is under negative pressure, and therefore, the jet suction part 10 can suck in the groundwater 53. The sucked-in groundwater 53 goes up between the inner pipe 6a and the outer pipe 7a. The pumping pump 9 must be capable of pumping up the groundwater 53 to a height of 1000 m when the depth of the pumping well 20 is 1000 m.

Figure 3:
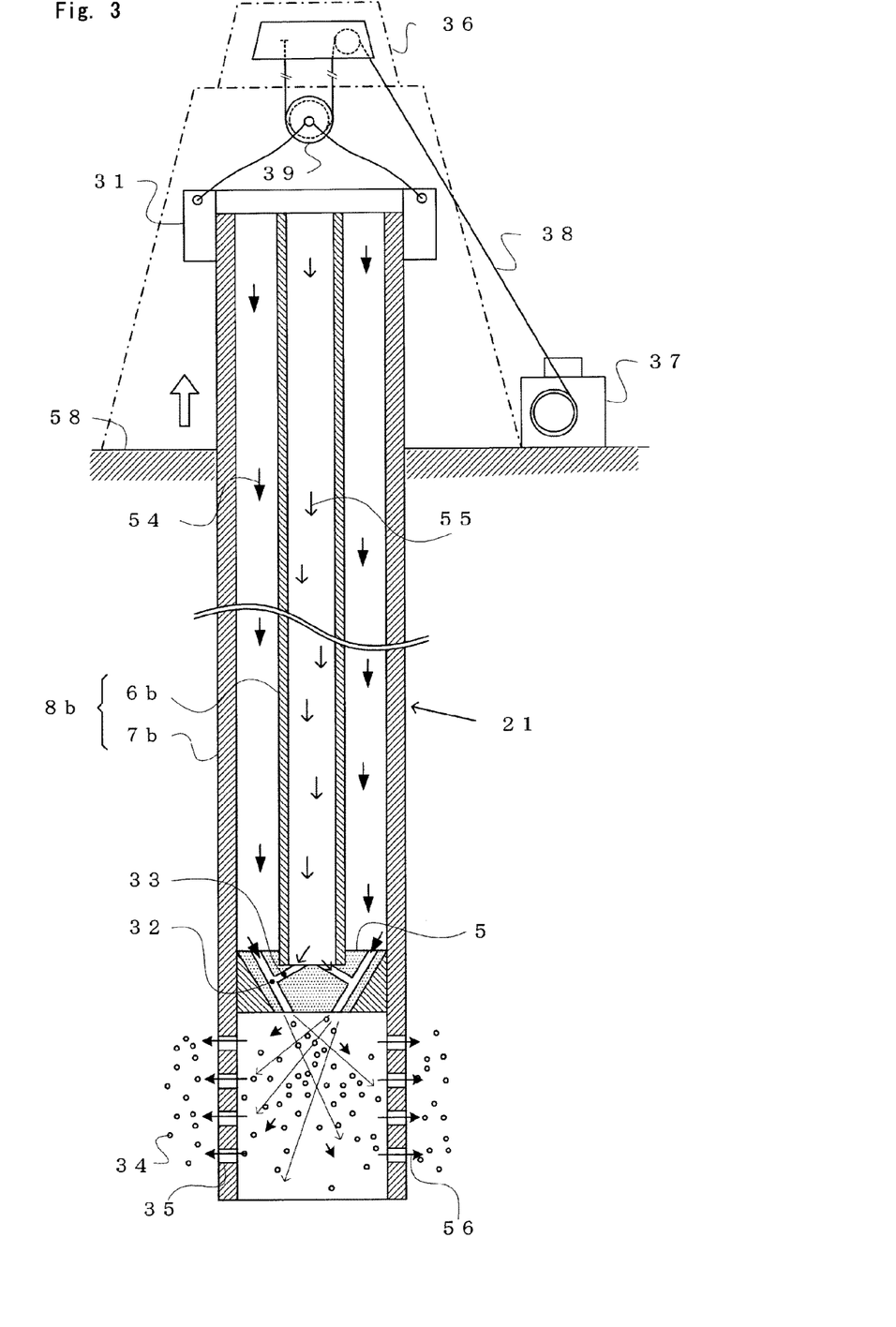
FIG. 3 is a cross-sectional view of a double pipe that constitutes an injection well (Embodiment 1).

FIG. 3 is a cross-sectional view that shows the double pipe of the injection well and related elements of this embodiment. An inner-pipe raising/lowering device 31 is mounted to the aboveground part of the double pipe 8b.

The inner-pipe raising/lowering device 31 includes
a suspension fixture 40 that is mounted to the upper end of the inner pipe 6b,
a pulley 39 that extends from the pulley block at the top of the tower 36,
a winch (hoisting machine) 37 that is installed on the ground, and
a winding-and-rewinding wire rope 38.

The inner pipe 6b and the nozzle 5 that is mounted at the bottom of the inner pipe 6b are raised or lowered by the inner-pipe raising/lowering device, and therefore, the gas-liquid mixture 56 can be injected not only into the bottom of the injection well but also at the top of the injection well. Also, when the fluid is injected at the top, a new injection slit needs to be provided to the outer pipe 7b. So, the inner pipe 6b and the nozzle 5 are pulled up above the ground, and the outer pipe 7b is bored, using an explosive, so as to form the new slit. After the inner pipe 6b and the nozzle 5 are lowered again to be set in the position shown in FIG. 3, the fluid is injected.

To produce carbon dioxide bubbles in the injection water 54 using the nozzle 5, the same method as that for discharging air in the form of fine air bubbles into water can be applied. This can be an injector method, a swirling-flow method, or a cavitation method. Here, an injector method having a simple structure is adopted, and the nozzle is constituted so as to be suitable for the double pipe. The outside diameter of the nozzle 5 equals the inside diameter of the outer pipe 7b, and the nozzle 5 is mounted to the bottom of the inner pipe 6b. An inclined injection-water spray pipe 32, one end of which is opened between the outer pipe 7b and the inner pipe 6b and the other end of which is opened at the bottoms of the outer pipe 7b and the inner pipe 6b, is installed inside the nozzle 5. A carbon-dioxide spray pipe 33, one end of which is opened to the inner pipe 6b and the other end of which is connected with the intermediate portion of the injection-water spray pipe 32, is also installed. Plural sets of injection-water spray pipes 32 and carbon-dioxide spray pipes 33 are provided.

Because the flow path of the injection-water spray pipe 32 is narrow, the rate of flow of the injection water 54 is high, and the portion of the inside of the injection-water spray pipe 32 that is connected with the carbon-dioxide spray pipe 33 that is connected with the injection-water spray pipe 32 is under negative pressure, and thus the carbon dioxide 55 is drawn into the injection-water spray pipe 32 in the form of bubbles 34. The cross-sectional area at the bottom of the outer pipe 7b is larger than that of the portion of the outer pipe 7b at which the inner pipe 6 is situated, and therefore the pressure of the injection water 54 inside the inner pipe is significantly less than the pressure outside the inner pipe. Thus, the generation of fine bubbles by cavitation is promoted. Here, the diameter of the fine bubbles is from about 0.01 mm to several mm. A device for generating so-called microbubbles having a diameter of 50 µm or less can be used.

The slit 35 at the bottom of the injection well 21 is at L0. If the resistive pressure of the deep aquifer at that point is P0, the pressure of the non-bubble injection water is $P0+P\alpha$. $P\alpha$ is about 1.0 MPa at maximum. In the case of the gas-liquid mixture 56, the water pressure is reduced to ($P\beta$) due to the bubbles 34, so the fluid must be pressurized as much as that reduced pressure ($P\beta$). Therefore, the pressure of the injection water 54 must be $P0+P\alpha+P\beta$. From this pressure, the emission pressure of the water injection pump 14 is determined. Even if the carbon dioxide 55 is not pressurized, the carbon dioxide 55 is drawn toward the injection-water spray pipe 43 by the nozzle 5. If it is desired to increase the mixing volume of the carbon dioxide 55, the carbon dioxide 55 can be slightly pressurized. As described above, this system does not require a high temperature-and-high-pressure facility for turning carbon dioxide into a supercritical fluid.

Figure 4:
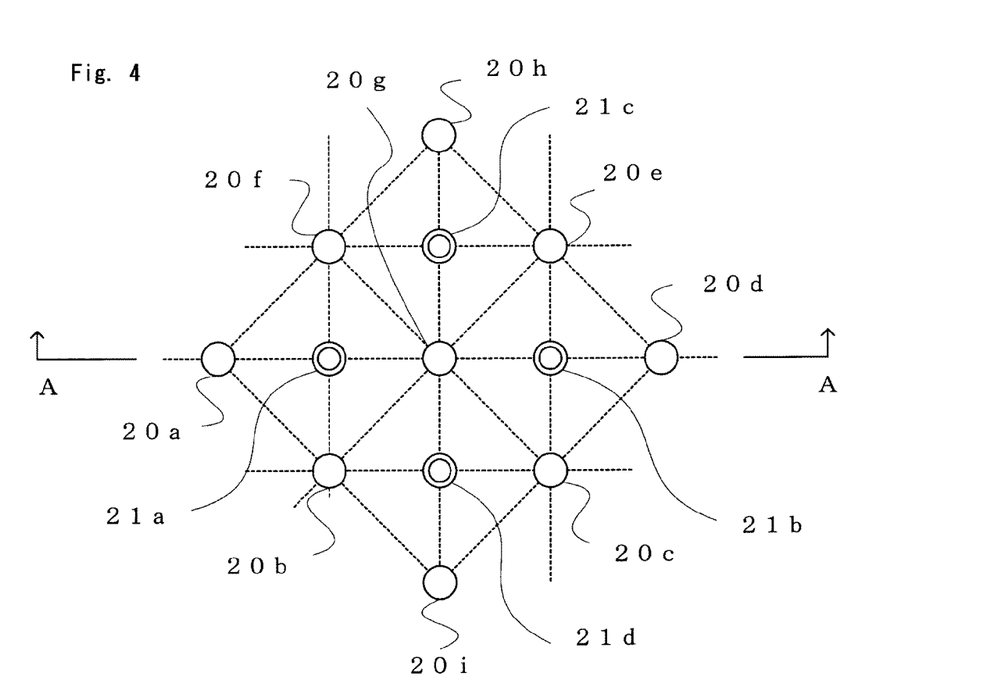
FIG. 4 shows the arrangement of the pumping well and the injection well (Embodiment 1).

FIG. 4 shows the arrangement of the pumping well and the injection well. The arrangement and the number of injection wells 21 for carbon dioxide are determined separately for each project according to the total amount of carbon dioxide to be stored, the injection rate, the volume of the objective deep aquifer, the permeability of the rock, and so on. FIG. 4 shows that carbon dioxide is stored at two periods of time. In the first storage period, injection wells 21a, 21b are used, and pumping wells 20a, 20b, 20c, 20d, 20e, 20h, 20f, 20g are used so as to surround the injection wells. In the second storage period, in view of the variation in soil permeability, injection wells 21c, 21d are used, and the pumping wells 20b, 20i, 20c, 20e, 20h, 20f, 20g are used so as to surround the injection wells. The pumping well is also used as a well for monitoring storage status. It is necessary that the suction pressure of the pumping well 20 pumping up from the deep aquifer be balanced with the injection pressure of the injection well 21 that is injecting carbon dioxide 55 into the deep aquifer.

Figure 5:
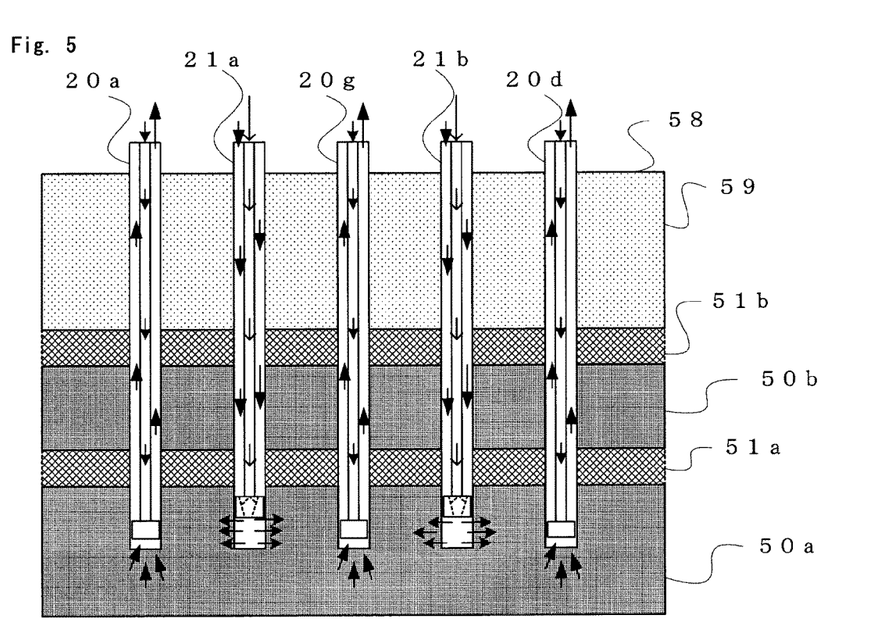
FIG. 5 is a cross-sectional view taken along a line A-A of FIG. 4 (Embodiment 1).

FIG. 5 is a cross-sectional view along the line A-A of FIG. 4. The non-storage layer 59 under the soil surface 58 is a layer not suitable for storing carbon dioxide. Also, if there are multiple deep aquifers, carbon dioxide is first stored in the deepest deep aquifer 50a. Thereafter, the cation-forming material is injected at the top of that deep aquifer 50a, carbon dioxide is stored in the deep aquifer 50b above that one, and then the cation-forming material is injected into the top of the deep aquifer 50b. If the impermeable layer 51a is thick and rigid, injection of the cation-forming material at the top of the deep aquifer 50a can be omitted. After completion of all injecting operations, the pumping wells and the injection wells are left to be used as monitoring wells.

Figure 6:
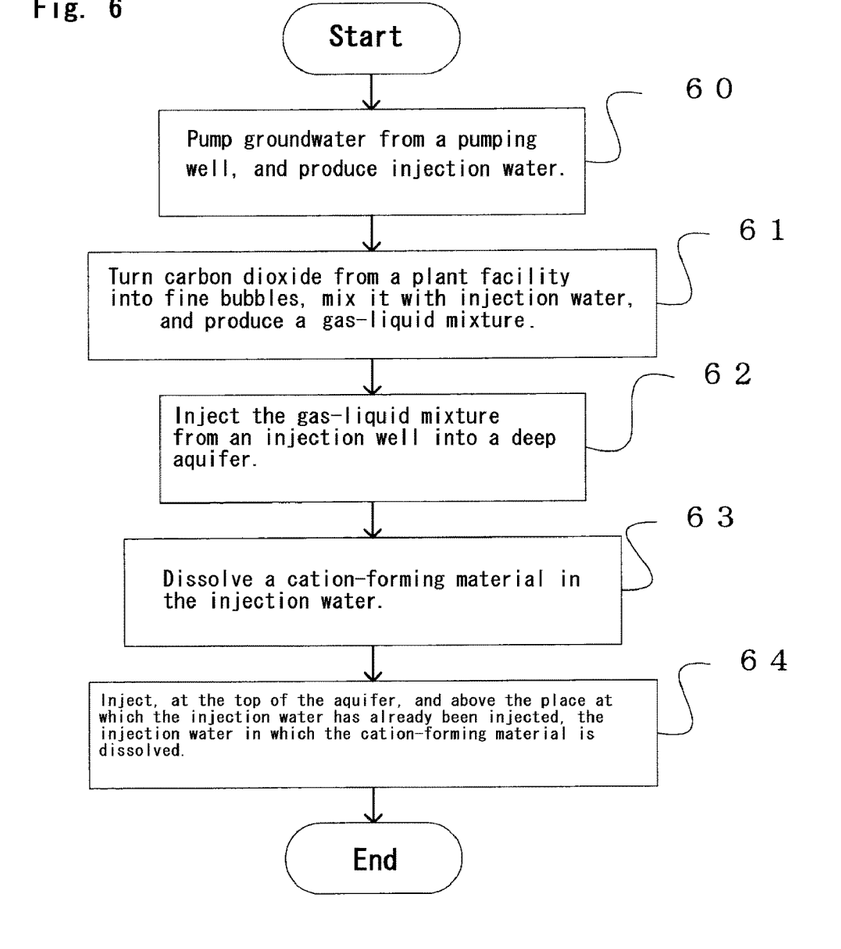
FIG. 6 is a flow chart showing the present invention's procedures for storing carbon dioxide underground (Embodiment 1).

FIG. 6 is a flow chart showing the procedure for storing carbon dioxide underground. Each of the numbers 60-64 denotes a treatment step.

Although the present invention relates to underground storage of carbon dioxide, it can also be applied to underground storage of other global-warming gases.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only be definition contained in the appended claims and equivalents thereof.

What is claimed is:

1. A method for storing carbon dioxide underground, comprising:
   pumping up groundwater from a deep aquifer through a pumping well to aboveground to produce injection water;
   changing carbon dioxide that has been separated and recovered from exhaust gas from a plant facility into fine bubbles, and mixing the carbon dioxide bubbles with said injection water so as to produce a gas-liquid mixture;
   injecting said gas-liquid mixture through an injection well into the deep aquifer;
   dissolving a cation-forming material in said injection water; and
   injecting said injection water, in which said cation-forming material is dissolved, into the top portion of said deep aquifer, at a position higher than where said gas-liquid mixture has already been injected.

2. A system for storing carbon dioxide underground, comprising:
   a pumping well that reaches a deep aquifer;
   a pump which pumps up groundwater from said pumping well;
   an injection well that reaches said deep aquifer;
   a liquid injection device that feeds into said injection well as injection water said groundwater, that has been pumped up;
   a gas injection device that feeds into said injection well carbon dioxide that has been separated and recovered from exhaust gas from a plant facility; and
   a nozzle that is arranged inside said injection well and that changes said carbon dioxide into fine bubbles,
   wherein said carbon dioxide is changed into fine bubbles and carbon dioxide bubbles are dissolved in said injection water, and
   a gas-liquid mixture, which is a mixture of the fine bubbles of said carbon dioxide with said injection water, is injected into said deep aquifer.

3. The system described in claim 2 for storing carbon dioxide underground,
   wherein a double pipe that includes an outer pipe and an inner pipe is installed in said injection well, said injection water is fed into between said outer pipe and said inner pipe, and said carbon dioxide is fed into said inner pipe.

4. The system described in claim 3 for storing carbon dioxide underground,
   wherein said nozzle has an outside diameter equal to the inside diameter of said outer pipe, and said nozzle is mounted to the top end of said inner pipe, wherein said nozzle includes an injection-water spray pipe formed inside said nozzle, and one end of which is open at the top of said nozzle between said outer pipe and said inner pipe, and the other end of which is open at the bottom of said nozzle, and
   a carbon-dioxide spray pipe, one end of which is open at said inner pipe at the top of said nozzle, and the other end of which is connected to an intermediate part of said injection-water spray pipe.

5. The system described in claim 4 for storing carbon dioxide underground, further comprising:
   a device for raising and lowering said inner pipe; and
   a cation-forming-material dissolving device;
   wherein said inner pipe and said nozzle, which have been installed so as to reach said deep aquifer, are pulled up to the top of said deep aquifer, and
   the injection water, in which the cation-forming material is dissolved, is injected into a position higher than where said gas-liquid mixture has already been injected.

* * * * *